United States Patent
Buck et al.

(10) Patent No.: US 8,113,059 B2
(45) Date of Patent: Feb. 14, 2012

(54) CIRCUIT MODULE

(75) Inventors: Thomas Buck, Tamm (DE); Ralf Reichenbach, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 366 days.

(21) Appl. No.: 12/227,844

(22) PCT Filed: Jun. 14, 2007

(86) PCT No.: PCT/EP2007/055868
§ 371 (c)(1), (2), (4) Date: Apr. 27, 2009

(87) PCT Pub. No.: WO2008/017537
PCT Pub. Date: Feb. 14, 2008

(65) Prior Publication Data
US 2009/0205435 A1  Aug. 20, 2009

(30) Foreign Application Priority Data
Aug. 11, 2006 (DE) .......................... 10 2006 037 692

(51) Int. Cl.
*B60C 23/04* (2006.01)
(52) U.S. Cl. .......................................................... 73/753
(58) Field of Classification Search .................. 73/146, 73/146.5, 753; 310/322, 334, 339
See application file for complete search history.

(56) References Cited

U.S. PATENT DOCUMENTS

| | | | |
|---|---|---|---|
| 6,175,302 B1 | 1/2001 | Huang | |
| 6,252,336 B1 * | 6/2001 | Hall | 310/339 |
| 7,116,036 B2 * | 10/2006 | Balasubramaniam et al. | 310/322 |
| 7,631,554 B2 * | 12/2009 | Behrends et al. | 73/146.5 |
| 2003/0209064 A1 * | 11/2003 | Adamson et al. | 73/146 |
| 2006/0022555 A1 | 2/2006 | Balasubramaniam et al. | |
| 2008/0266985 A1 | 10/2008 | Behrends et al. | |

FOREIGN PATENT DOCUMENTS

| | | |
|---|---|---|
| DE | 102004031810 | 1/2006 |
| WO | WO 2006072539 | 7/2006 |

OTHER PUBLICATIONS

International Search Report, PCT International Patent Application No. PCT/EP2007/055868, dated Feb. 12, 2008.

* cited by examiner

*Primary Examiner* — Freddie Kirkland, III
(74) *Attorney, Agent, or Firm* — Kenyon & Kenyon LLP

(57) ABSTRACT

A circuit module, in particular a tire sensor module, which at least includes: a substrate, on or in which at least one component is mounted, a piezoelement, which has at least one clamping region and at least one oscillatory region, the piezoelement being clamped in its clamping region on the substrate or on an arrangement secured to the substrate, and its oscillatory region being accommodated in a manner that permits oscillation, contacts provided on the piezoelement for tapping off a piezoelectric voltage, and a current-supply circuit, which receives the piezoelectric voltage generated by the piezoelement, being used as a voltage source for supplying power to the circuit module. The piezoelement is preferably clamped between at least two substrate elements, at least one cavity being formed within which the at least one oscillatory region of the piezoelement is accommodated in a manner that permits deflection, and is limited in its oscillation displacement.

13 Claims, 2 Drawing Sheets

CIRCUIT MODULE

FIELD OF THE INVENTION

The present invention relates to a circuit module that can be used, in particular, as a tire sensor.

BACKGROUND INFORMATION

Tire sensors are used, in particular, for measuring internal tire pressure (tire pressure monitoring system, TPMS), as well as the temperature or accelerations which occur inside of the tire. In this connection, a sensor module typically includes a circuit substrate, at least one sensor component, and an antenna via which data are transmitted to a transceiver on the vehicle. Two types of conventional systems supply power. In one system, the energy is supplied by a battery or a galvanic cell, and, in the other, by electromagnetic radiation or incoupling.

An autonomous, battery-based energy supply raises environmental concerns, particularly because of high disposal costs and the outlay entailed in separation processes during disassembly. Tire sensor modules of this kind are typically mounted on the tire rim since the galvanic cells used as batteries must be disposed of separately from the rubber tire material and since they do not tolerate the temperatures that occur in the tire during vulcanization. In addition, the service life is limited by the capacity of the battery which often is not replaceable; since the sensor module is limited in size, the batteries should not be dimensioned to be too large.

When current is supplied by electromagnetic radiation, respectively, incoupling, in principle, a passive transponder is formed; however, the signal that can thereby be read out is weak. In addition, a high-intensity query signal is needed.

SUMMARY

An object of the present invention is to provide an energy converter in the circuit module which, due to the piezoelectric effect, converts the deformation energy occurring in response to mechanical load, in particular flexural stress and/or pressure, into an electrical voltage that can be used to supply the electronics. Particularly in the case of discontinuous mechanical loads or discontinuous operation of the electronics, the generated energy can also be buffered in an energy-storage device, for example in a capacitor or accumulator.

In accordance with an example embodiment of the present invention, the piezoelement is supported on the substrate, it being clamped in clamping regions and capable of executing a free oscillatory motion by at least one other freely oscillating region. In accordance with one especially preferred specific embodiment, the piezoelement is clamped between two substrate elements, in particular two substrate halves; the substrate halves form a cavity therebetween within which the piezoelement is able to freely oscillate without being mechanically damaged. The depth and shape of the cavity allows it to function as overload stops to limit oscillatory motion or deflection, a stop arrangement being optionally provided as well for this purpose.

In addition, at least one substrate half may also be used as a circuit substrate for the supplementary components, for example for the sensor, ASIC, and passive and active components, it being possible for them to be configured on the circuit substrate or in the cavity that accommodates the piezoelement.

All additional components, as well as a voltage-supply circuit for receiving the piezoelectric voltage and for supplying the supply voltage, the energy-storage device and, for example, the antenna, as well, are also advantageously provided on the circuit substrate which clamps the piezoelement. Thus, a compact, highly integrated circuit module may also be implemented. This is especially advantageous for an integration in a tire, since, in this case, the component size is a very critical parameter.

Basically, any shape may be selected for the ceramic piezoelement; on the one hand, it may be rectangular, in particular also square. However, round ceramic disks are also possible, for instance. In addition, form design and size may also be selected as a function of the natural frequency to be set. For example, a width may be selected that increases toward the oscillating regions or away therefrom. In this connection, the resonant frequency may be tuned as a function of the spring constant provided for the piezoelement and, in addition thereto, by optionally attaching a seismic mass.

The contacting of the piezoelement may be provided by the connection in the clamping region, for example by a conductive adhesive or solder, so that further contacts are not required.

Thus, several advantages may be derived in accordance with an example embodiment of the present invention:

The circuit module has an autonomous energy supply, so that there is no need for any additional batteries or galvanic cells that are characterized by a limited service life and problematic disposal. As a mechanical-electrical energy converter, the piezoelement, which utilizes the already occurring mechanical loads, produces the energy required for operation.

The present invention provides an autonomous circuit module, in particular sensor module, which features a long service life, minimal disposal problems, respectively excellent environmental compatibility, a design that is not overly complex, and a high integration density. Because the piezoelement is clamped between the substrate halves that are already used for accommodating the components and, optionally, for external shielding, few additional auxiliary devices are required.

Thus, the circuit module according to the present invention may be used wherever regular or irregular mechanical loads occur. This is possible, in particular, for a use as a tire sensor module, which may be introduced, for example, vulcanized or bonded directly into the rubber material of the tire, for example in the area of the tread, or be held or clamped in a pocket, and, thus, is able to measure the occurring accelerations more efficiently than in the area of the wheel rim, for example.

BRIEF DESCRIPTION OF THE DRAWINGS

The present invention is explained in greater detail below in light of the accompanying figures and with reference to a few specific embodiments.

DETAILED DESCRIPTION OF EXAMPLE EMBODIMENTS

Figure 2:
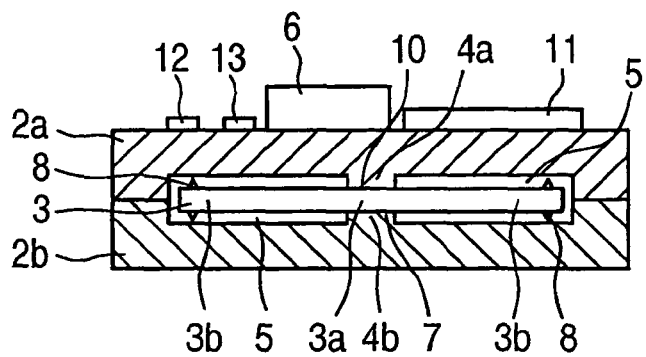
FIG. 2 shows a circuit module in accordance with a first specific embodiment having a piezoelement that is fixed in the center.

A circuit module 1 according to the present invention shown in FIG. 2 is composed of at least two substrate halves 2a and 2b and of a piezoelement 3 of a ceramic material that is fastened therebetween. Active or passive components 6, 11, 12, 13 are accommodated on at least one of substrate halves 2a, 2b in a generally known manner.

Figure 1:
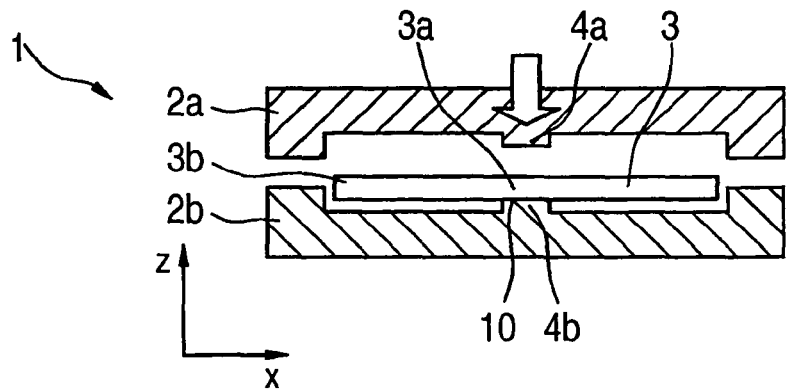
FIG. 1 shows the integration of a piezoelement between two substrate halves.

In accordance with an example embodiment of the present invention, piezoelement 3 is clamped at one or a plurality of locations. FIG. 1, 2 show a specific embodiment where, as clamping region 3a, a middle region 3a of piezoelement 3 is clamped by two mutually opposing clamping regions 4a, 4b, in the form of projections, of substrate halves 2a, 2b in the Z direction by the formation of a clamp-type connection 7, one continuous or two separate cavities 5 extending in the x direction being formed between substrate halves 2a and 2b, within which cavities outer ends 3b of piezoelement 3 are able to oscillate in the xz plane as oscillatory regions 3b.

Figure 3:
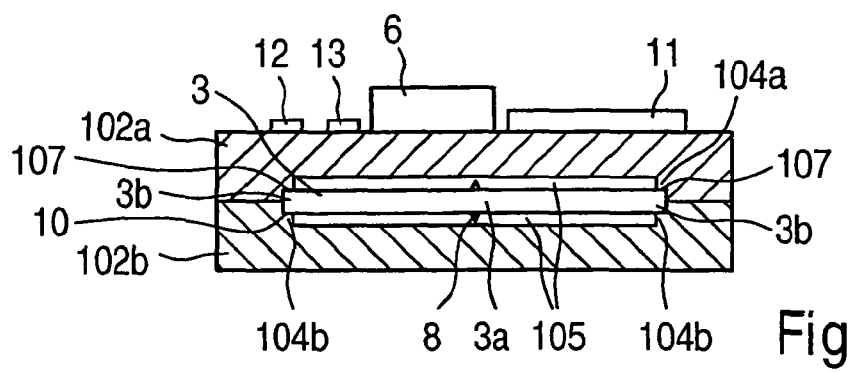
FIG. 3 shows a circuit module in accordance with another specific embodiment having a piezoelement that is clamped in the end regions.

Alternatively, in accordance with circuit module 101 of FIG. 3, laterally outer ends 3b of plate-shaped piezoelement 3 may be clamped in laterally outer clamping locations 104a, 104b of substrate halves 102a, 102b, so that middle region 3a of piezoelement 3 oscillates, i.e., executes a flexural oscillation. Thus, two clamp-type connections 107 are formed laterally outwardly, a continuous cavity 105 being formed between substrate halves 102a, 102b.

Thus, piezoelement 3 is supported by a positive engagement of the two substrate halves 2a, 2b and 102a, 102b, respectively; additionally, other auxiliary devices may be attached to or formed on substrate halves 2a, 2b and 102a, 102b, respectively, to clamp the piezoelement. The depth and shape of cavity 105, respectively of the plurality of cavities 5, allow it to function as overload stops to limit the deflection of the mechanical flexural oscillation of outer ends 3b according to FIG. 2 and, correspondingly, of middle region 3a according to FIG. 3. In this connection, a stop arrangement 8 may be additionally provided, either in accordance with FIGS. 2 and 3 on piezoelement 3, or fundamentally also on substrate halves 2a, 2b, 102a, 102b, so that they extend into cavity 5, 105 and limit the deflection of oscillating region 3a and, respectively, 3b of piezoelement 3.

Piezoelement 3 may be contacted directly via clamp-type connections 7 and, respectively, 107 between substrate halves 2a, 2b and, respectively, 102a, 102b and piezoelement 3; to this end, conductive contact layers 10 are advantageously provided as electrodes between clamping regions 3a and 3b, respectively, of piezoelement 3 and clamping locations 4a, 4b, 104a, 104b of the substrate halves. Contact layer 10 may, in particular, be a conductive adhesive, for example silver conductive adhesive, or a solder layer. In this case, the contacting may take place at the top side and/or bottom side of piezoelement 3, i.e., with top substrate half 2a, respectively, 102a and/or bottom substrate half 2b, respectively, 102b.

Piezoelement 3 is advantageously fabricated from a ceramic material, for example, PZT (lead zirconate titanate) and, therefore, exhibits a high level of flexural resistance, so that oscillating regions 3a, 3b of piezoelement 3 that are not clamped are subject to slight deflections in cavity 5.

Piezoelement 3 may be contacted in one sequence of operation and be accommodated, respectively, packed in substrate halves 2a, 2b, respectively, 102a, 102b. In this context, piezoelement 3 is completely encapsulated between substrate halves 2a, 2b, respectively, 102a, 102b, so that it is protected from environmental influences.

Components 6, 11, 12, 13 may be selected as a function of the use of circuit module 1, respectively, 101; in this connection, a current-supply circuit 12 is provided which receives piezoelectric voltage Up supplied by the piezoelement, rectifies the same, and is used as a voltage source for the entire circuit module. In the case of the illustrated configurations, the piezoelectric voltage generally occurs between the top and bottom sides of piezoelement 3, in response to a flexural oscillation, generated piezoelectric voltage Up undergoing a change in operational sign, respectively a change in polarity, and then being rectified by a rectifier circuit 12 that is installed as a component and used as a current-supply circuit, in addition thereto, it preferably adapting to load; moreover, the voltage is smoothed and buffered by a capacitor 13 used as an energy storage device.

Figure 5:
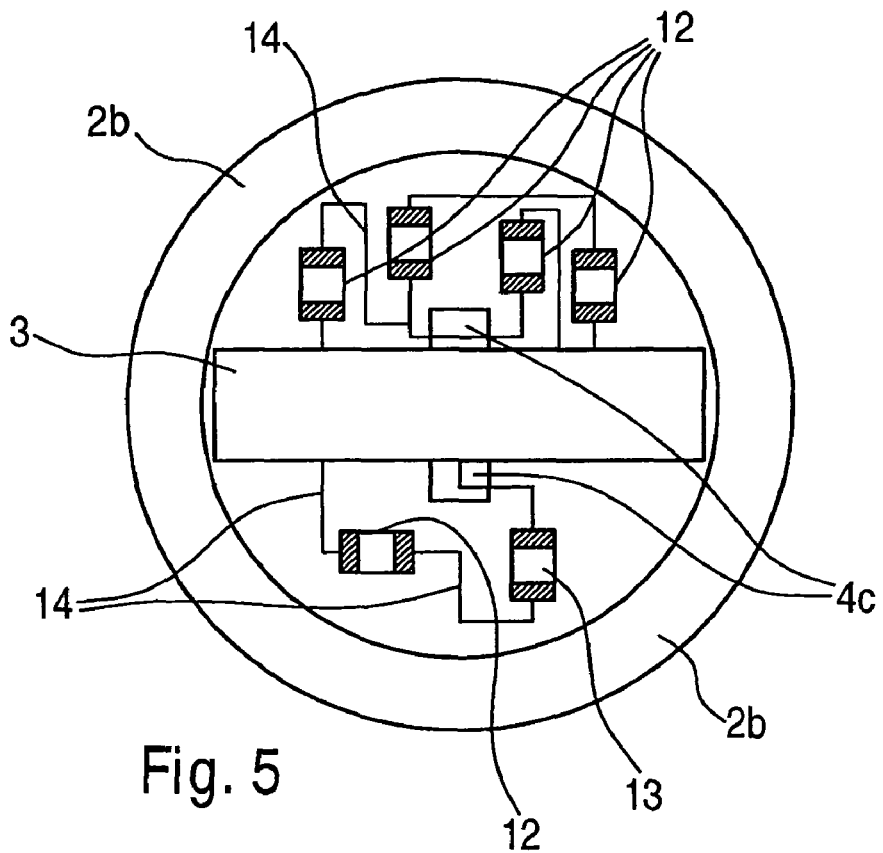
FIG. 5 is a plan view of a substrate half including a clamped piezoelement, in a specific embodiment including the attachment of other components.

In addition, a sensor component 6, a control device, for example an ASIC 11 and other components may be installed; moreover, printed conductors 14 and solder pads, illustrated in the plan view in FIG. 5, for accommodating components 6, 11, 12, 13, as well as for contacting piezoelement 3 are configured on substrate half 2b, 102b in question in a conventional manner.

Components 6, 11, 12, 13 may also be located in cavity 5 between substrate halves 2a, 2b in a region where they are not affected by oscillating region 3a, respectively, 3b of piezoelement 3. Thus, in this specific embodiment, both piezoelement 3, as well as components 6, 11, 12, 13, and, accordingly, printed conductors 14 and bond pads, respectively, solder pads are held securely between substrate halves 2a, 2b. In a specific embodiment of this kind, there is no need, in principle, for another housing to accommodate substrate halves 2a, 2b.

Figure 4:
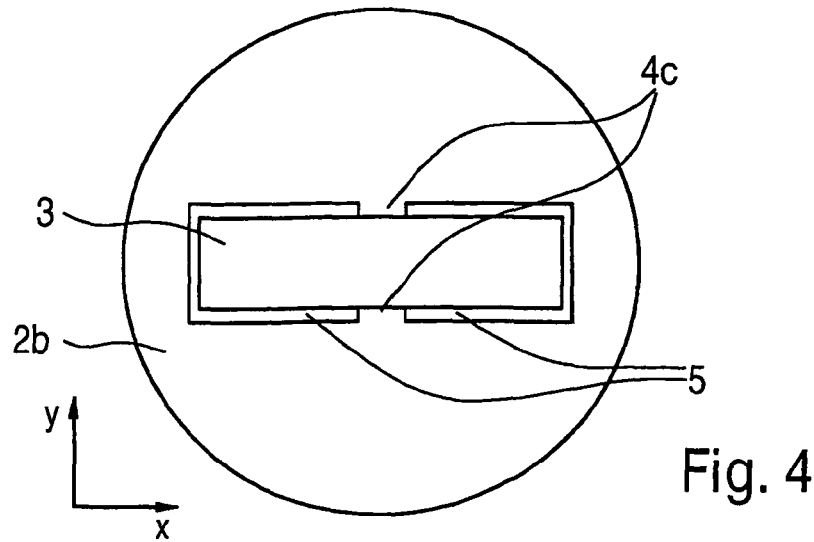
FIG. 4 is a plan view of a substrate half of the circuit module including a clamped piezoelement from FIG. 1.

In accordance with the plan view of FIGS. 4 and 5, piezoelement 3 is fixed in its respective clamping region (in this case, middle region 3a) in the y direction by lateral contact regions 4c of one or both substrate halves 2a or 2b. In this case, a certain mutually opposing load pressure may be exerted by contact regions 4c to hold piezoelement 3 in clamping engagement. In addition, the two electrodes of piezoelement 3 may also be contacted via these lateral contact regions 4c.

Substrate halves 2a and 2b of the substrate stack may be circuit boards or ceramic substrates, for example. Piezoelement 3 may contact components 6, 11, 12, 13 provided on the top side of a substrate half 2a, 102a, in particular, by way of vias extending through at least one substrate half 2a.

Figure 6:
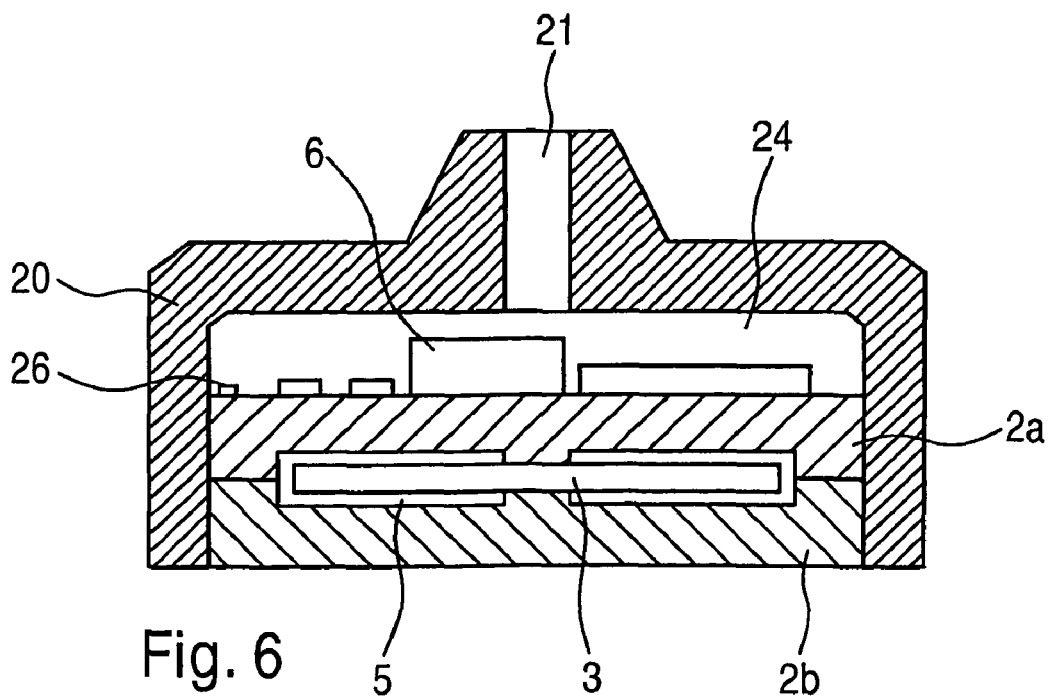
FIG. 6 shows a cross section through a circuit module used as a pressure sensor, including the housing.

Circuit module 1, 101 according to the present invention may be used for various applications where an autonomous energy supply is useful or necessary. FIG. 6 shows the specific embodiment of a circuit module 1 having additional housing 20 which holds substrate stack 2a, 2b, together with piezoelement 3 and the components that are accommodated in a free space 24. For a use as a pressure-sensor module, a hole 21 is provided for pressure access to free space 24 to enable sensor component 6 to measure the ambient pressure. Housing 20 may be simply placed on substrate stack 2a, 2b and be secured by a bonded connection, for example. Depending on the application, a housing part may also be mounted on the bottom side. As explained above, housing 20 may also be omitted in that the corresponding components are accommodated between substrate halves 2a, 2b.

In the case of a use as a tire-sensor module, an antenna 26 is typically provided for transmitting antenna signals to a transceiver provided in the vehicle that is located, for example, on the top substrate half or on housing 20.

What is claimed is:

1. A circuit module, comprising:
   a substrate on or in which at least one component is mounted;
   a piezoelement which has at least one clamping region and at least one oscillatory region, the piezoelement being clamped in clamping region on one of the substrate, or on an arrangement secured to the substrate, and the at least one oscillatory region being accommodated in a manner that permits oscillation, the piezoelement including contacts to tap off a piezoelectric voltage; and
   a current-supply circuit which receives the piezoelectric voltage generated by the piezoelement and is used as a voltage source to supply power to the circuit module;
   wherein a middle region of the piezoelement is clamped as the clamping region, and lateral outer end regions of the piezoelement are accommodated in a manner which allows the lateral outer end regions to oscillate freely as oscillatory regions;
   wherein electrically conductive layers are applied to the clamping region of the piezoelement as the contacts to tap off the generated piezoelectric voltage, and wherein the contacts form a mechanical connection of the piezoelement with the substrate at the clamping region.

2. The circuit module as recited in claim 1, wherein, as the substrate, at least two substrate elements are provided between which the piezoelement is clamped, between the substrate elements, at least one cavity being formed within which the at least one oscillatory region of the piezoelement is accommodated in a manner that permits deflection, and is limited in its oscillation displacement.

3. The circuit module as recited in claim 2, wherein at least one stop arrangement for limiting the oscillation displacement is configured at least one of on the piezoelement and on at least one of the substrate elements.

4. The circuit module as recited in claim 2, wherein at least one of the components is accommodated in the at least one cavity between the substrate elements.

5. The circuit module as recited in claim 1, wherein the electrically conductive layers include one of conductive adhesive layers or solder.

6. The circuit module as recited in claim 1, wherein the piezoelement is the only energy source of the circuit module which is free of self-consuming energy sources.

7. The circuit module as recited in claim 1, wherein the current-supply circuit has a rectifier and an energy storage device for buffering energy produced by the piezoelement.

8. The circuit module as recited in claim 1, wherein the current-supply circuit is made up of one or a plurality of components mounted on the substrate.

9. The circuit module as recited in claim 1, wherein at least a portion of the components is mounted on a top side of the substrate and is connected to the piezoelement by way of vias.

10. The circuit module as recited in claim 1, wherein the at least one component includes at least one sensor component to measure at least one of pressure, temperature, and acceleration.

11. The circuit module as recited in claim 1, wherein the circuit module is accommodated in a housing.

12. The circuit module as recited in claim 1, further comprising:
    an antenna to transmit antenna signals.

13. A vehicle tire, comprising:
    a tire formed of a rubber material; and
    a circuit module, one of: i) vulcanized or bonded into the rubber material, or ii) held or clamped in a pocket of the tire, the circuit module including:
    a substrate on or in which at least one component is mounted,
    a piezoelement which has at least one clamping region and at least one oscillatory region, the piezoelement being clamped in its clamping region on one of the substrate, or on an arrangement secured to the substrate, and the at least one oscillatory region being accommodated in a manner that permits oscillation, the piezoelement including contacts to tap off a piezoelectric voltage, and
    a current-supply circuit which receives the piezoelectric voltage generated by the piezoelement and is used as a voltage source to supply power to the circuit module;
    wherein a middle region of the piezoelement is clamped as the clamping region, and lateral outer end regions of the piezoelement are accommodated in a manner which allows the lateral outer end regions to oscillate freely as oscillatory regions;
    wherein electrically conductive layers are applied to the clamping region of the piezoelement as the contacts to tap off the generated piezoelectric voltage, and wherein the contacts form a mechanical connection of the piezoelement with the substrate at the clamping region.

* * * * *